US008583807B2

(12) United States Patent
Malhar et al.

(10) Patent No.: US 8,583,807 B2
(45) Date of Patent: Nov. 12, 2013

(54) APPARATUS AND METHODS FOR PROVIDING ENHANCED MOBILE MESSAGING SERVICES

(75) Inventors: Sahana Malhar, San Diego, CA (US); Janell Paulson, Carlsbad, CA (US); Masri Bassam, San Diego, CA (US)

(73) Assignee: PALM, Inc., Sunnyvale, CA (US)

( * ) Notice: Subject to any disclaimer, the term of this patent is extended or adjusted under 35 U.S.C. 154(b) by 339 days.

(21) Appl. No.: 12/262,322

(22) Filed: Oct. 31, 2008

(65) Prior Publication Data

US 2010/0115035 A1 May 6, 2010

(51) Int. Cl.
   *G06F 15/16* (2006.01)
(52) U.S. Cl.
   USPC .................................................... 709/228
(58) Field of Classification Search
   USPC ................ 709/204–207; 370/93.01
   See application file for complete search history.

(56) References Cited

U.S. PATENT DOCUMENTS

| 5,381,527 | A * | 1/1995 | Inniss et al. | 709/239 |
| 5,812,795 | A * | 9/1998 | Horovitz et al. | 709/245 |
| 2006/0075091 | A1 * | 4/2006 | Beyda et al. | 709/224 |
| 2007/0116195 | A1 | 5/2007 | Thompson et al. | |
| 2007/0142029 | A1 * | 6/2007 | Willehadson et al. | 455/405 |
| 2007/0283039 | A1 * | 12/2007 | Kim et al. | 709/238 |
| 2008/0215694 | A1 | 9/2008 | Chen et al. | |
| 2009/0181641 | A1 * | 7/2009 | Fiatal | 455/406 |

FOREIGN PATENT DOCUMENTS

| KR | 1020050020911 | 5/2005 |
| KR | 1020060046657 | 5/2006 |
| WO | WO-01/69387 | 9/2001 |
| WO | 2005001545 A1 | 5/2005 |

OTHER PUBLICATIONS

PCT/US2009/062827 International Search Report and Written Opinion, 11 pages.
EPO, Extended International Search Report dated Dec. 12, 2012, EP Pat App No. 09824186.2, filed May 31, 2011.

* cited by examiner

*Primary Examiner* — Scott Christensen

(57) ABSTRACT

Various embodiments for providing enhanced mobile messaging services are described. In one or more embodiments, a mobile computing device may send messages of different types. The mobile computing device may allow a sender to compose a message independently of message type. The mobile computing device may automatically determine both a message type for the message and the transfer medium by which to send the message. The mobile computing device may consider factors including message contents, network availability and reliability, historical data, cost, sender preferences, recipient preferences, etc. Other embodiments are described and claimed.

20 Claims, 4 Drawing Sheets

Message Composer 200

- To: 204
- Subject: 206
- Text: 208
- Attach Item(s) 210
- Priority 212
- Custom Field(s) 214

216

New | Menu

FIG. 2

APPARATUS AND METHODS FOR PROVIDING ENHANCED MOBILE MESSAGING SERVICES

BACKGROUND

A mobile computing device such as a combination handheld computer and mobile telephone or smart phone generally may provide voice and data communications functionality, as well as computing and processing capabilities. In addition to supporting voice or data and voicemail services, a mobile computing device may support various other types of mobile messaging services such as facsimile, e-mail, instant messaging (IM), short message service or enhanced message service (SMS/EMS) messaging, multimedia message service (MMS) messaging, video conferencing, and so forth. Further, various transfer media may be available to transmit messages, such as wireless, cellular telephone, etc. The various messaging services may have differing costs associated with them, and not all messaging services or transfer media may be available at any given time. Accordingly, there may be a need for an improved apparatus and methods for providing enhanced mobile messaging services.

BRIEF DESCRIPTION OF THE DRAWINGS

FIG. 2 illustrates a messaging user interface in accordance with one or more embodiments.

DETAILED DESCRIPTION

Various embodiments are directed to providing enhanced mobile messaging services. In one or more embodiments, a mobile computing device may send and receive messages of different types and over different transfer media. In an embodiment, a mobile computing device may include an automatic messaging manager to determine available transfer media and available message types for sending a composed message. The mobile computing device may automatically select a transfer medium from the available transfer media and a message type from the available message types. The mobile device may automatically format the composed message to the selected message type, and send a message to a recipient according to the selected medium and message type.

Figure 1:
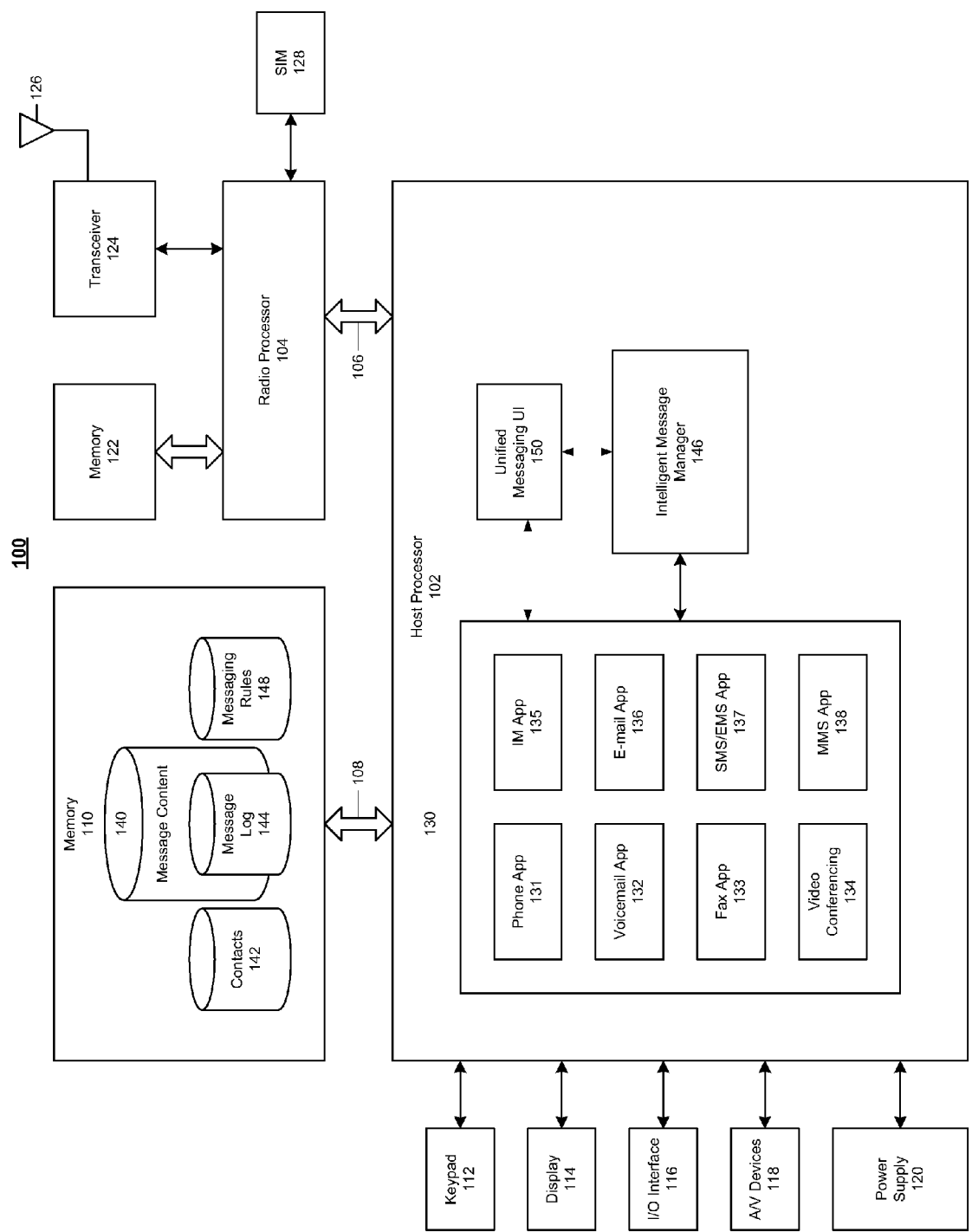
FIG. 1 illustrates a mobile computing device in accordance with one or more embodiments.

FIG. 1 illustrates a mobile computing device 100 in accordance with one or more embodiments. Mobile computing device 100 may be implemented as a combination handheld computer and mobile telephone, sometimes referred to as a smart phone. Examples of smart phones include, for example, Palm® products such as Palm® Treo™ smart phones. Although some embodiments may be described with mobile computing device 100 implemented as a smart phone by way of example, it may be appreciated that the embodiments are not limited in this context. For example, mobile computing device 100 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, pager, messaging device, data communication device, and so forth.

Mobile computing device 100 may provide voice communications functionality in accordance with different types of cellular radiotelephone systems. Examples of cellular radiotelephone systems may include Code Division Multiple Access (CDMA) systems, Global System for Mobile Communications (GSM) systems, North American Digital Cellular (NADC) systems, Time Division Multiple Access (TDMA) systems, Extended-TDMA (E-TDMA) systems, Narrowband Advanced Mobile Phone Service (NAMPS) systems, third generation (3G) systems such as Wide-band CDMA (WCDMA), CDMA-2000, Universal Mobile Telephone System (UMTS) systems, and so forth.

In addition to voice communications functionality, mobile computing device 100 may be arranged to provide data communications functionality in accordance with different types of cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), Long Term Evolution (LTE), and so forth.

Mobile computing device 100 may be arranged to provide voice and/or data communications functionality in accordance with different types of wireless network systems. Examples of wireless network systems may include a wireless local area network (WLAN) system, wireless metropolitan area network (WMAN) system, wireless wide area network (WWAN) system, and so forth. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth.

Mobile computing device 100 may be arranged to perform data communications in accordance with different types of shorter range wireless systems, such as a wireless personal area network (PAN) system. One example of a suitable wireless PAN system offering data communication services may include a Bluetooth system operating in accordance with the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Other examples may include systems using infrared techniques or near-field communication techniques and protocols, such as electromagnetic induction (EMI) techniques. An example of EMI techniques may include passive or active radio-frequency identification (RFID) protocols and devices.

As shown in the embodiment of FIG. 1, mobile computing device 100 may comprise a dual processor architecture including a host processor 102 and a radio processor 104. In various implementations, the host processor 102 and the radio processor 104 may be arranged to communicate with each other using interfaces 106 such as one or more universal serial bus (USB) interfaces, micro-USB interfaces, universal asynchronous receiver-transmitter (UART) interfaces, general purpose input/output (GPIO) interfaces, control/status lines, control/data lines, audio lines, and so forth. Other embodiments may comprise a single processor, or multiple processors, without departing from the spirit of the invention.

The host processor 102 may be responsible for executing various software programs such as system programs and applications programs to provide computing and processing operations for the mobile computing device 100. The radio processor 104 may be responsible for performing various voice and data communications operations for mobile computing device 100 such as transmitting and receiving voice and data information over one or more wireless communications channels. Although some embodiments may be described as comprising a dual processor architecture for purposes of illustration, it is worthy to note that mobile computing device 100 may comprise any suitable processor architecture and/or any suitable number of processors consistent with the described embodiments.

The host processor 102 may be implemented as a host central processing unit (CPU) using any suitable processor or logic device, such as a general purpose processor. Although some embodiments may be described with the host processor 102 implemented as a CPU or general purpose processor by way of example, it may be appreciated that the embodiments are not limited in this context. For example, the host processor 102 may comprise, or be implemented as, a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the host processor 102 may be coupled through a memory bus 108 to a memory 110. The memory bus 108 may comprise any suitable interface and/or bus architecture for allowing the host processor 102 to access the memory 110. Although the memory 110 may be shown as being separate from the host processor 102 for purposes of illustration, it is worthy to note that in various embodiments some portion or the entire memory 110 may be included on the same integrated circuit as the host processor 102. Alternatively, some portion or the entire memory 110 may be disposed on an integrated circuit or other medium (e.g., hard disk drive) external to the integrated circuit of host processor 102. In various embodiments, mobile computing device 100 may comprise an expansion slot to support a multimedia and/or memory card, for example.

The memory 110 may be implemented using any machine-readable or computer-readable media capable of storing data such as volatile memory or non-volatile memory, removable or non-removable memory, erasable or non-erasable memory, writeable or re-writeable memory, and so forth. Examples of machine-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

Mobile computing device 100 may comprise an alphanumeric keypad 112 coupled to the host processor 102. The keypad 112 may comprise, for example, a QWERTY key layout and an integrated number dial pad. Mobile computing device 100 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth.

Mobile computing device 100 may comprise a display 114 coupled to the host processor 102. Display 114 may comprise any suitable visual interface for displaying content to a user of the mobile computing device 100. In one embodiment, for example, display 114 may be implemented by a liquid crystal display (LCD) such as a touch-sensitive color (e.g., 16-bit color) thin-film transistor (TFT) LCD screen. In some embodiments, the touch-sensitive LCD may be used with a stylus, a handwriting recognition program, or gesture technology.

Mobile computing device 100 may comprise an input/output (I/O) interface 116 coupled to the host processor 102. The I/O interface 116 may comprise one or more I/O devices such as a serial connection port, an infrared port, integrated Bluetooth® wireless capability, and/or integrated 802.11x (WiFi) wireless capability, to enable wired (e.g., USB cable) and/or wireless connection to a local computer system, such as a local personal computer (PC). In various implementations, mobile computing device 100 may be arranged to transfer and/or synchronize information with the local computer system.

The host processor 102 may be coupled to various audio/video (A/V) devices 118 that support A/V capability of the mobile computing device 100. Examples of A/V devices 118 may include, for example, a microphone, one or more speakers, an audio port to connect an audio headset, an audio coder/decoder (codec), an audio player, a digital camera, a video camera, a video codec, a video player, and so forth.

The host processor 102 may be coupled to a power supply 120 arranged to supply and manage power to the elements of the mobile computing device 100. In various embodiments, the power supply 120 may be implemented by a rechargeable battery, such as a removable and rechargeable lithium ion battery to provide direct current (DC) power, and/or an alternating current (AC) adapter to draw power from a standard AC main power supply.

As mentioned above, the radio processor 104 may perform voice and/or data communication operations for the mobile computing device 100. For example, the radio processor 104 may be arranged to communicate voice information and/or data information over one or more assigned frequency bands of a wireless communication channel. In various embodiments, the radio processor 104 may be implemented as a communications processor using any suitable processor or logic device, such as a modem processor or baseband processor. Although some embodiments may be described with the radio processor 104 implemented as a modem processor or baseband processor by way of example, it may be appreciated that the embodiments are not limited in this context. For example, the radio processor 104 may comprise, or be implemented as, a digital signal processor (DSP), media access control (MAC) processor, or any other type of communications processor in accordance with the described embodiments.

In various embodiments, the radio processor 104 may perform analog and/or digital baseband operations for the mobile computing device 100. For example, the radio processor 104 may perform digital-to-analog conversion (DAC), analog-to-digital conversion (ADC), modulation, demodulation, encoding, decoding, encryption, decryption, and so forth.

Mobile computing device 100 may comprise a memory 122 coupled to the radio processor 104. The memory 122 may be implemented using one or more types of machine-readable or computer-readable media capable of storing data such as volatile memory or non-volatile memory, removable or non-removable memory, erasable or non-erasable memory, writeable or re-writeable memory, and so forth. The memory 122 may comprise, for example, flash memory and secure digital (SD) RAM. Although the memory 122 may be shown as being separate from and external to the radio processor 104 for purposes of illustration, it is worthy to note that in various embodiments some portion or the entire memory 122 may be included on the same integrated circuit as the radio processor 104.

Mobile computing device 100 may comprise a transceiver module 124 coupled to the radio processor 104. The transceiver module 124 may comprise one or more transceivers arranged to communicate using different types of protocols, communication ranges, operating power requirements, RF sub-bands, information types (e.g., voice or data), use scenarios, applications, and so forth. In various embodiments, the transceiver module 124 may comprise one or more transceivers arranged to support voice communication for a cellular radiotelephone system such as a GSM, UMTS, and/or CDMA system. The transceiver module 124 also may comprise one or more transceivers arranged to perform data communications in accordance with one or more wireless communications protocols such as WWAN protocols (e.g., GSM/GPRS protocols, CDMA/1xRTT protocols, EDGE protocols, EV-DO protocols, EV-DV protocols, HSDPA protocols, etc.), WLAN protocols (e.g., IEEE 802.11a/b/g/n, IEEE 802.16, IEEE 802.20, etc.), PAN protocols, Infrared protocols, Bluetooth protocols, EMI protocols including passive or active RFID protocols, LTE protocols, and so forth. In some embodiments, the transceiver module 124 may comprise a Global Positioning System (GPS) transceiver to support position determination and/or location-based services.

The transceiver module 124 generally may be implemented using one or more chips as desired for a given implementation. Although the transceiver module 124 may be shown as being separate from and external to the radio processor 104 for purposes of illustration, it is worthy to note that in various embodiments some portion or the entire transceiver module 124 may be included on the same integrated circuit as the radio processor 104. The embodiments are not limited in this context.

Mobile computing device 100 may comprise an antenna system 126 for transmitting and/or receiving electrical signals. As shown, the antenna system 126 may be coupled to the radio processor 104 through the transceiver module 124. The antenna system 126 may comprise or be implemented as one or more internal antennas and/or external antennas.

Mobile computing device 100 may comprise a subscriber identity module (SIM) 128 coupled to the radio processor 104. The SIM 128 may comprise, for example, a removable or non-removable smart card arranged to encrypt voice and data transmissions and to store user-specific data for allowing a voice or data communications network to identify and authenticate the user. The SIM 128 also may store data such as personal settings specific to the user.

As mentioned above, the host processor 102 may be arranged to provide processing or computing resources to the mobile computing device 100. For example, the host processor 102 may be responsible for executing various software programs such as system programs and application programs to provide computing and processing operations for the mobile computing device 100.

System programs generally may assist in the running of mobile computing device 100 and may be directly responsible for controlling, integrating, and managing the individual hardware components of the computer system. Examples of system programs may include, without limitation, an operating system (OS), device drivers, programming tools, utility programs, software libraries, application programming interfaces (APIs), and so forth. Mobile computing device 100 may utilize any suitable OS in accordance with the described embodiments such as a Palm OS®, Palm OS® Cobalt, Microsoft® Windows OS, Microsoft Windows® CE, Microsoft Pocket PC, Microsoft Mobile, Symbian OS™, Embedix OS, Linux, Binary Run-time Environment for Wireless (BREW) OS, JavaOS, a Wireless Application Protocol (WAP) OS, and so forth.

Application programs generally may allow a user to accomplish one or more specific tasks. Examples of application programs may include, without limitation, one or more messaging applications (e.g., voice or data, voicemail, facsimile, e-mail, IM, SMS/EMS, MMS, video conferencing), a web browser application, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth. In various implementations, the application programs may provide one or more graphical user interfaces (GUIs) to communicate information between mobile computing device 100 and a user. In some embodiments, application programs may comprise upper layer programs running on top of the OS of the host processor 102 that operate in conjunction with the functions and protocols of lower layers including, for example, a transport layer such as a Transmission Control Protocol (TCP) layer, a network layer such as an Internet Protocol (IP) layer, and a link layer such as a Point-to-Point (PPP) layer used to translate and format data for communication.

As shown in FIG. 1, mobile computing device 100 may comprise or implement several messaging applications 130 arranged to communicate various types of messages in a variety of formats. Each of the messaging applications 130 may be representative of a particular kind of transport, enabling handling of messages of particular types and formats for the particular application. Messaging applications 130 may comprise, for example, a phone application 131 such as a cellular telephone application, a Voice over Internet Protocol (VoIP) application, a Push-to-Talk (PTT) application, a voice or data application, and so forth. Messaging applications 130 may further comprise a voicemail application 132, a facsimile application 133, a video teleconferencing application 134, an IM application 135, an e-mail application 136, an SMS/EMS application 137, and an MMS application 138. It is to be understood that the embodiments are not limited in this regard and that messaging applications 130 may include any other type of messaging or communications application which is consistent with the described embodiments. It also is to be appreciated that mobile computing device 100 may implement other types of applications in addition to messaging applications 130 which are consistent with the described embodiments.

Mobile computing device 100 may comprise a message content database 140. Message content database 140 may be arranged to store content and attachments (e.g., media objects) of messages sent and received by messaging applications 130. Message content database 140 may be implemented in memory 110 of the mobile computing device, for example.

Mobile computing device 100 also may comprise a contacts database 142. Contacts database 142 may be arranged to store contact records for individuals or entities specified by the user of mobile computing device 100. The contact record for an individual may comprise identifying information such as first name, last name, company/employer name, mailing addresses (e.g., home, work, other), telephone numbers (e.g., home, work, mobile, fax, pager), e-mail address (e.g., home, work, primary, alternative), IM screen names, SMS/EMS identifier, MMS identifier, personal information, notes, and so forth. The contact record for an individual may further include preferences for the contact, such as preferred messaging types and/or transfer media for a contact. The contact record for an individual may further include a history of past messages to and/or from the contact, and may include information about the past messages, such as the message type, transfer medium used, success of delivery, etc.

Contacts database 142 may be used or accessed when receiving and/or sending messages. In various embodiments, identifying information (e.g., telephone number, e-mail address, IM screen name, SMS/EMS identifier, MMS identifier, etc.), included in messages received by the messaging applications 130 may be compared against the contacts database 142 to identify the sender of a message. The contacts database 142 also may be used or accessed when composing and/or sending messages. For example, the user of mobile computing device 100 may search for and open the contact record of a particular individual to initiate communication.

Mobile computing device 100 may comprise a message log 144. The message log 144 may be arranged to track various types of messages which are sent and received by the mobile computing device. Entries in the message log 144 may reflect recently made or attempted communications. In various implementations, the entries in the message log 144 may be accessed by the user for replying to a missed message and/or for reinitiating or reattempting communication with a particular individual. Message log 144 may record success or failure of a communication, including the recipient, transfer medium, date and time stamp, location sent from, message size, message type of the communication, etc.

As shown in FIG. 1, mobile computing device 100 may comprise or implement an intelligent message manager 146 coupled to messaging applications 130. In various embodiments, intelligent message manager 146 may be arranged to access and communicate with one or more of message content database 140, contacts database 142, and message log 144. Intelligent message manager 146 may comprise, for example, hardware and/or software such as messaging logic (e.g., instructions, data, and/or code) to be executed by a logic device (e.g., host processor 102). The messaging logic may be stored internally or externally to the logic device on one or more types of computer-readable storage media. In various implementations, intelligent message manager 146 may communicate with a messaging rules database 148 arranged to store rules and parameters for controlling the selection of transfer media and messaging types for composed messages according to a set of criteria.

In various embodiments, intelligent message manager 146 may be arranged to determine which transfer media are available to send a message. Transfer media may include, for example, a cellular telephone network, a wireless network, etc. A transfer medium may have a cost associated with it, and may vary in availability and reliability, depending on, for example, the location of the mobile computing device. A transfer medium may also affect power consumption on mobile computing device 100.

Intelligent message manager 146 may be arranged to examine one or more components of a composed message and, in conjunction with selecting a transfer medium, determine which message type to generate from the composed message. Message components may include, for example, text, multimedia files, etc. Message types may include, for example, voice or data messages, voicemail messages, fax messages, video conferencing messages, instant messaging (IM) messages, e-mail messages, short message service or enhanced message service (SMS/EMS) messages, and multimedia message service (MMS) messages. In an example, a message that contains only a text component may be a candidate for an IM, an e-mail, or a SMS/EMS message. A message that contains an audio file may be a candidate, for example, for a voicemail message or a MMS message.

Intelligent message manager 146 may be arranged, for example, to weigh transfer media availability, cost and reliability in conjunction with message components, such as message priority. For example, for the text-based message scenario given above, an IM message may cost money per message for the sender, while an SMS/EMS message may be free for the sender.

Intelligent message manager 146 may be arranged to consider other criteria when selecting a transfer medium and a messaging type. For example, the preferences of the recipient of the message may influence the selection. A recipient may, for example, prefer to receive SMS/EMS messages over e-mail messages. The user of mobile device 100 may input a recipient's preferences, for example, in a contact record for the recipient in contacts database 142.

Other criteria may include, for example, power availability and consumption, a speed of a transfer medium, message priority, other user specified criteria, and historic knowledge of a best medium or message type based on the location of mobile device 100. The embodiments are not limited to these examples.

Mobile device 100 may provide a unified messaging user interface (UI) 150. Unified messaging UI 150 may provide a single UI that allows a sender to compose a message. Unified messaging UI 150 may be independent of message type. Thus, a sender may compose a message by adding one or more message components via the UI 150 and then send the message without having to select a message type or transfer medium explicitly. Unified messaging UI 150 is discussed further below with respect to FIG. 2.

FIG. 2 illustrates a messaging UI 200, in accordance with one or more embodiments, that may be displayed to a user of mobile computing device 100 of FIG. 1. Messaging UI 200 may be an embodiment of unified messaging UI 150. In various embodiments, the messaging UI 200 may be supported by messaging applications 130.

As shown, the messaging UI 200 may comprise a title bar 202 for displaying the title of the unified messaging application. The messaging UI 200 also may comprise a number of fields corresponding to message components. For example, recipient field 204 may correspond to a recipient component, and may allow the sender to enter one or more recipients for the message. In an embodiment, the sender may add a recipient by manually entering an email address or a telephone number, for example, by using a keypad or a stylus. Embodiments may provide a "loop-up" or "browse" button or menu to allow the sender to access and add a recipient from stored contact information from contacts database 142. Embodiments may allow the sender to mix the format for the recipients. For example, the sender may add an email address and a telephone number to the same composed message. Recipients may be added by telephone number, e-mail address, IM screen name, SMS/EMS identifier, MMS identifier, and so forth.

Messaging UI 200 may further include a subject field 206, which may correspond to a subject message component. The sender may add a subject to the message, for example, by typing text from a keypad, using a stylus or using gesture technology.

Messaging UI 200 may further include a text field 208, which may correspond to a text message component. The sender may add text to the message, for example, by typing text from a keypad, using a stylus, or using gesture technology. Text field 208 may contain plain text or formatted text.

Messaging UI 200 may further include an attachment field 210, which may correspond to an attachment message component. The sender may add one or more attachments to the message. Attachments may include, for example, documents, audio files, video files, image files, etc. Embodiments may imbed the attachment(s) in the message. The sender may select items to attach in several ways. For example, embodiments may allow the sender to browse for items stored on device 100, in memory 122 or in message content 140. Embodiments are not limited to this example.

Messaging UI 200 may further include a priority field 212 to allow the sender to select the priority of the message. Messages marked as "high priority" or "urgent," for example, may cause intelligent message manager 142 to rank speed and/or reliability higher than other factors, such as cost, in selecting a transfer medium. A use may select a priority, for example, by selecting from a menu, or selecting one of a set of buttons corresponding to different priorities, etc.

Messaging UI 200 may further include one or more custom fields 214, which may correspond to other message components. Custom fields 212 may be user-defined. Custom fields 212 may include specially formatted fields, for example, to hold formatted text, hypertext markup language (HTML) or extensible markup language (XML). Custom fields 212 may contain universal resource locators (URLs) or images such as icons or emoticons. Custom fields 212 may include a priority setting for the message. Custom fields 212 may include a message's expected delivery date/time or expiration date/time. Embodiments are not limited to these examples.

The messaging UI 200 may comprise a scroll bar 216 if necessary to scroll through the displayed message components.

Figure 3:
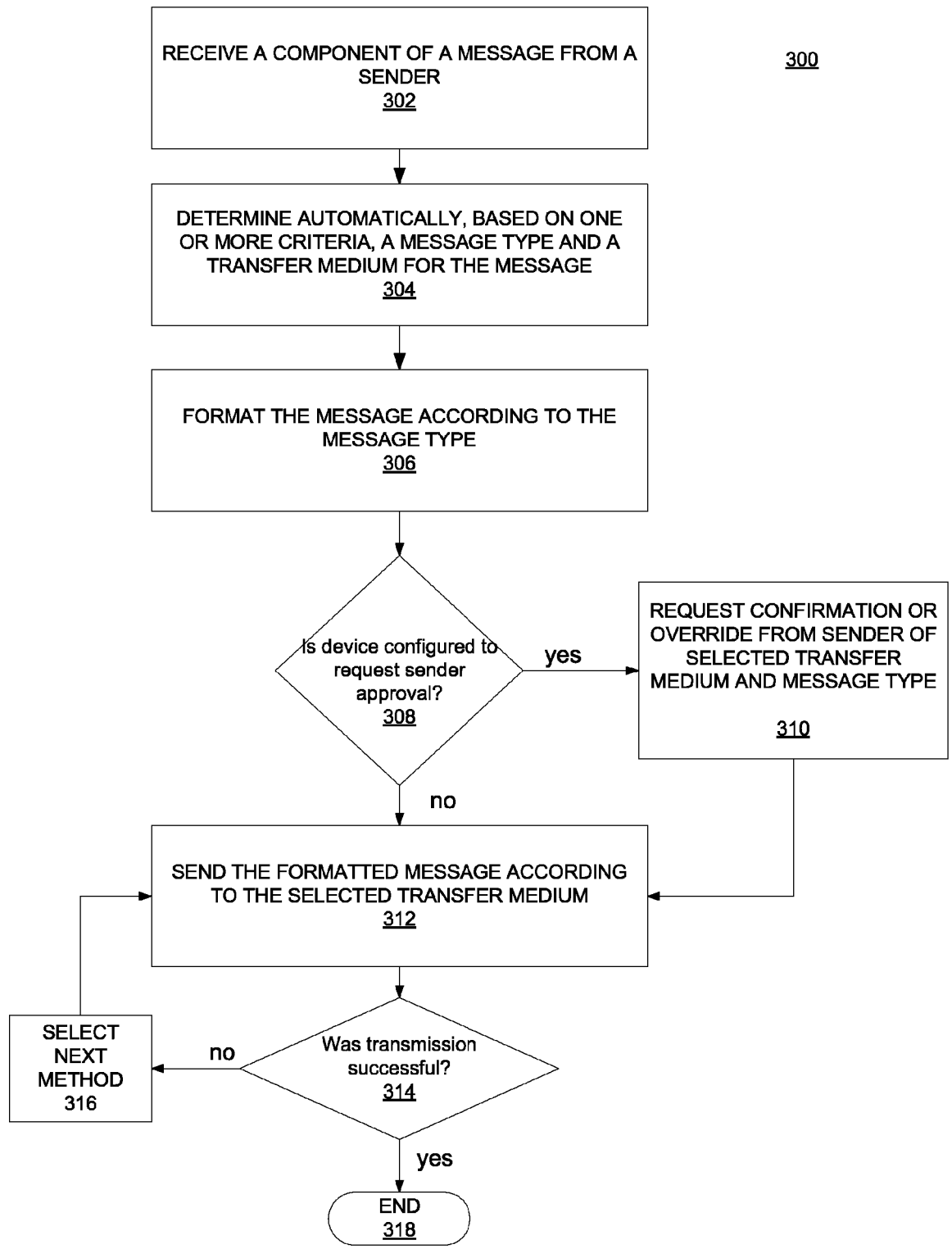
FIG. 3 illustrates a logic flow in accordance with one or more embodiments.

FIG. 3 illustrates a logic flow 300 in accordance with one or more embodiments. The logic flow 300 may be performed by various systems and/or devices and may be implemented as hardware, software, and/or any combination thereof, as desired for a given set of design parameters or performance constraints. For example, the logic flow 300 may be implemented by a logic device (e.g., processor) and/or logic (e.g., threading logic) comprising instructions, data, and/or code to be executed by a logic device. For purposes of illustration, and not limitation, the logic flow 300 is described with reference to FIGS. 1 and 2. The embodiments are not limited in this context.

In various embodiments, the logic flow 300 may comprise receiving a component of a message from the device user, i.e., the sender, in block 302. The message components may include, for example, those illustrated in FIG. 2.

In block 304, intelligent message manager 146 may determine, automatically, both a transfer medium and a message type for the message. The determination may be based on various criteria. The criteria may include, but are not limited to: sender preferences, receiver preferences, cost, network availability, network reliability, message components present in the composed message, message priority, the sender's selected network, signal strength, location, message size, historical data, etc. The criteria are discussed further below with respect to FIG. 4. Intelligent message manager 146 may employ one or more decision making algorithms or logical flows to select the transfer medium and message type. Intelligent message manager 146 may also make use of stored data, such as historical data in message log 144, and contact data from contact database 142. In an embodiment, intelligent message manager 146 may store a list or otherwise ranked set of additional transfer media and/or message types that may be used in the event that the first selection results in an unsuccessful transmission.

In block 306, intelligent message manager 146 or unified messaging UI 150 may format the message according to the selected message type, from the components entered by the sender. For example, a message made up of text, a recipient e-mail address, and a priority may be composed into an e-mail message. A message made up of an audio file may be composed as a voicemail message. The embodiments are not limited to these examples.

If device 100 is configured to request sender approval of the selected transfer medium and message type in block 308, intelligent message manager 146 may request confirmation from the sender in block 310. In block 310, the sender may approve the selection, or override the selection with another transfer medium and/or message type. In an embodiment, intelligent message manager 146 may display additional options for possible transfer media and/or message type to the sender in the event that the sender overrides the selection.

In the absence of a confirmation prompt, or when the sender confirms the selection, intelligent message manager 146 may send the formatted message via the selected transfer medium, in block 312. If the sender overrides the selection, intelligent message manager 146 may send the message according to the sender's selection.

In block 314, if the transmission is successful, the process ends at block 318. If the transmission is unsuccessful, intelligent message manager 146 may select the next "best" method and send the message again in block 312.

Figure 4:
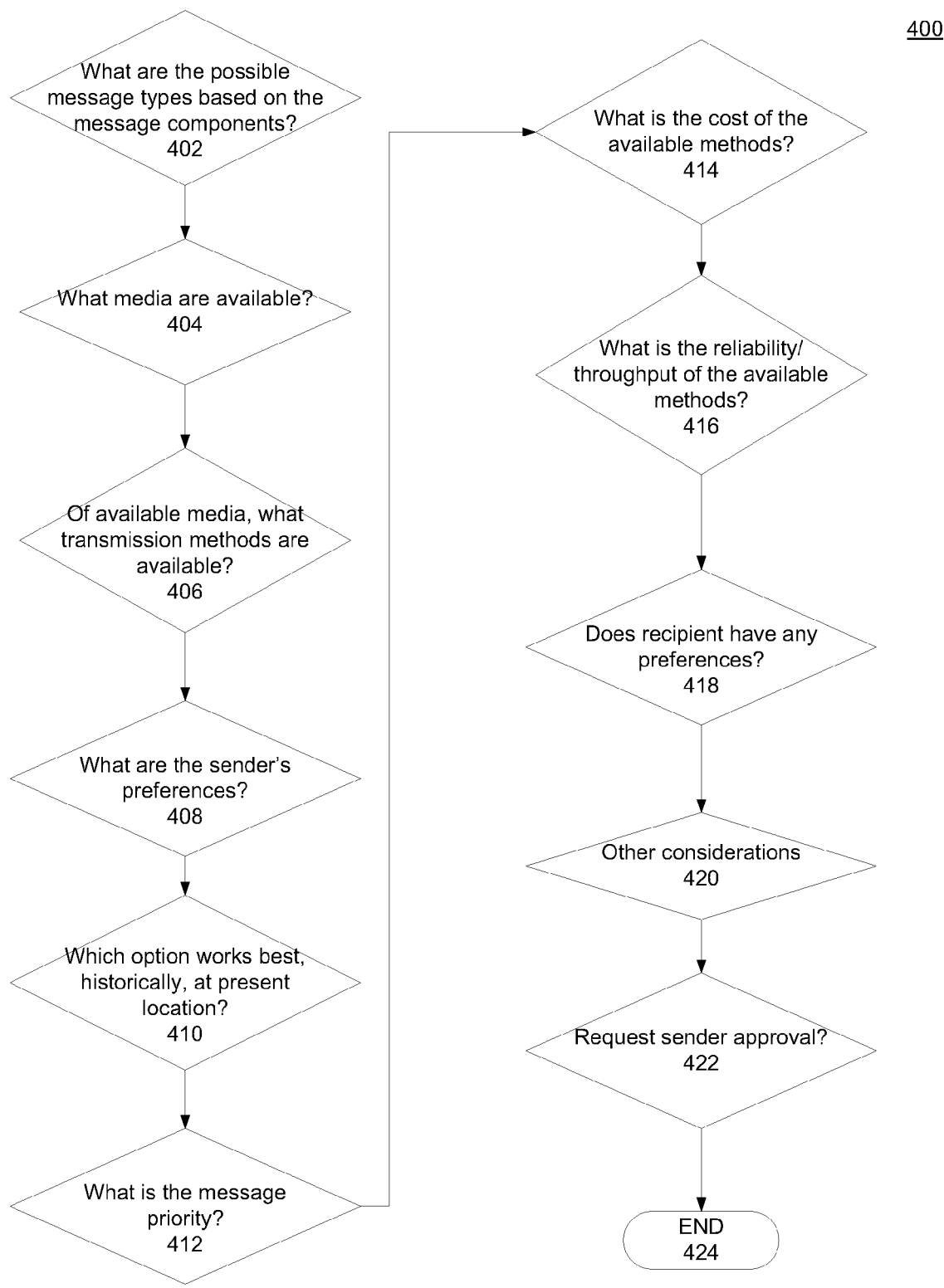
FIG. 4 illustrates a pseudo-decision tree in accordance with one or more embodiments.

FIG. 4 illustrates an example of a pseudo-decision tree 400 that may be used in selecting a transfer medium and a message type, as may occur, for example, in block 304.

In block 402, device 100 may determine the possible message types based on the message components composed by the sender.

In block 404, device 100, e.g. via intelligent message manager 146, may determine what transfer media are available. Availability of a transfer medium may be determined by, for example, signal strength, location, sender's network selection, message content, message size, etc.

In block 406, device 100 may determine which transmission methods are available via the available transfer media. For example, if a cellular network transfer medium is available, then voice or data calls and SMS/EMS messaging may be available.

In block 408, device 100 may determine and apply the sender's preferences for message delivery. For example, the sender may prefer instant messages (IM) over SMS, and SMS over e-mail. In an embodiment, device 100 may provide a user interface to allow the sender to specify and store such preferences.

In block 410, device 100 may determine which transfer medium and/or message type may be optimal, based on the location of device 100. Device 100 may make this determination based on stored data about previous message transmissions.

In block 412, device 100 may consider the message priority in selecting a message type or transfer medium.

In block 414, device 100 may determine the costs of the available transmission methods. For example, the sender may have a calling plan that allows a certain number of voice or data calls for no additional charge, while a text message on the same plan may incur a fee. Similarly, the sender may have exceeded the number of allowed calls, resulting in a larger fee for a voice or data call than for a text message. Embodiments of the invention may select the least-cost transmission method, or may assign a more favorable weight to transmission methods with lower or no cost. In an embodiment, device 100 may download and/or store cost data.

In block 416, device 100 may determine which of the available transfer media and transmission methods are the most reliable, have the greatest throughput, or are otherwise optimal according to some criterion. Such determination may consider current data, such as location and signal strength, message size, the sender's network selection, and/or historical data about previous attempts to send a similar message via the same transfer medium near the same location.

In block 418, device 100 may determine if the intended recipient has any preferences about how to receive a message from the sender.

In block 420, device 100 may use other considerations to narrow the selection of which transfer medium and/or message type to use. Other considerations may include, for example, the power consumption needed for a transfer medium. In some embodiments, device 100 may accept an override from the sender to override the device-selected transfer medium.

In block 422, device 100 may determine if sender approval of the selection is necessary, and may request such approval as needed.

The selection process may end at block 424 when at least one transfer medium and message type is selected.

Although FIG. 4 presents the various decisions in a linear, serial manner, embodiments may allow the decisions to take place in parallel, or in a combination of parallel and serial steps. The decisions may be made cyclically, or by following one or more branching decision trees. Further, the decisions illustrated in FIG. 4 are not limited to the order shown, and may take place in any order. Other considerations may also be included or omitted, and the embodiments are not limited to what is illustrated in FIG. 4.

Numerous specific details have been set forth to provide a thorough understanding of the embodiments. It will be understood, however, that the embodiments may be practiced without these specific details. In other instances, well-known operations, components and circuits have not been described in detail so as not to obscure the embodiments. It can be appreciated that the specific structural and functional details are representative and do not necessarily limit the scope of the embodiments.

Various embodiments may comprise one or more elements. An element may comprise any structure arranged to perform certain operations. Each element may be implemented as hardware, software, or any combination thereof, as desired for a given set of design and/or performance constraints. Although an embodiment may be described with a limited number of elements in a certain topology by way of example, the embodiment may include more or less elements in alternate topologies as desired for a given implementation.

It is worthy to note that any reference to "one embodiment" or "an embodiment" means that a particular feature, structure, or characteristic described in connection with the embodiment is included in at least one embodiment. The appearances of the phrase "in one embodiment" in the specification are not necessarily all referring to the same embodiment.

Although some embodiments may be illustrated and described as comprising exemplary functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media.

It also is to be appreciated that the described embodiments illustrate exemplary implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. With respect to software elements, for example, the term "coupled" may refer to interfaces, message interfaces, API, exchanging messages, and so forth.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a processor, or any combination thereof.

While certain features of the embodiments have been illustrated as described above, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus comprising:
a mobile computing device to send and receive messages of different types, the mobile computing device comprising:

a processor;
an intelligent message manager to:
  determine available transfer media and available message types for sending a composed message to a plurality of recipients,
  automatically select a transfer medium from the available transfer media and a message type from the available message types for each of the plurality of recipients, wherein the automatic selection is at least based on historical data of a best medium or message type from previous connection attempts based on the location of the mobile device, and
  provide a unified composer messaging interface to enable a sender to compose messages independently of message type; and
a messaging rules database to store criteria for controlling said automatic selection, the criteria including at least one of transfer medium cost, transfer medium reliability, historical data and message priority;
the mobile device to automatically format the composed message to the selected message type for each of the plurality of recipients, wherein each of the plurality of recipients is associated with a message of a different type, and
the mobile device to send a message to each of the plurality of recipients according to the selected medium and message type.

2. The apparatus of claim 1, the different message types comprising one or more of voice or data messages, voicemail messages, fax messages, video conferencing messages, instant messaging (IM) messages, e-mail messages, short message service or enhanced message service (SMS/EMS) messages, and multimedia message service (MMS) messages.

3. The apparatus of claim 1, the unified messaging interface to automatically format a composed message to at least one format selected by the intelligent message manager.

4. The apparatus of claim 3, the unified composer messaging interface to enable composition of a message comprising one or more media objects.

5. The apparatus of claim 1, the messaging interface comprising an icon corresponding to a hardware button of the mobile computing device.

6. The apparatus of claim 1, wherein the transfer medium is at least one of a wireless network, or a cellular network.

7. A method comprising:
  displaying, on a mobile computing device, a unified composer interface to enable the sender to compose messages independently of message type;
  receiving, by the unified composer messaging interface on the mobile computing device, at least one component of a message from a sender;
  determining, by the mobile computing device, automatically, based on historical data of a best medium or message type from previous attempts based on the location of the mobile computing device and one or more criteria, a message type and a transfer medium for the message for each of a plurality of recipients;
  formatting, by the mobile computing device, the message according to the message type for each of the plurality of recipients, wherein each of the plurality of recipients is associated with a message of a different type; and
  sending, by the mobile computing device, the formatted message to each of the plurality of recipients according to the selected transfer medium;
  wherein the one or more criteria include at least one of transfer medium cost, transfer medium reliability and message priority.

8. The method of claim 7, further comprising receiving a component including at least one of:
  text, hypertext markup language (HTML), extensible markup language (XML), an audio file, an image, or a video file.

9. The method of claim 7, further comprising determining a message type according to the at least one received component.

10. The method of claim 7, the message types comprising one or more of voice or data messages, voicemail messages, fax messages, video conferencing messages, instant messaging (IM) messages, e-mail messages, short message service or enhanced message service (SMS/EMS) messages, and multimedia message service (MMS) messages.

11. The method of claim 7, further comprising:
  receiving an alert that the sent message is not read/received within a time period;
  selecting at least one of an alternate message type or an alternate transfer medium; and
  resending the message according to the alternate message type and/or transfer medium.

12. The method of claim 7, further comprising:
  receiving confirmation that the message was received successfully; and
  storing the selected transfer medium and message type.

13. The method of claim 7, further comprising:
  prompting for approval from the sender of the selected message type and transfer medium;
  sending the formatted message according to the selected transfer medium when the sender approves; or
  receiving an override including at least one of an alternate transfer medium or an alternate message type from the sender when the sender does not approve; and
  sending the message according to the override.

14. A non-transitory machine-readable storage medium comprising instructions that when executed enable a mobile computing device to:
  display a unified composer interface to enable the sender to compose messages independently of message type;
  receive at least one component of a message from a sender;
  determine automatically, based on historical data of a best medium or message type from previous attempts based on the location of the mobile computing device and one or more criteria, a message type and a transfer medium for the message for each of a plurality of recipients;
  format the message according to the message type for each of the plurality of recipients, wherein each of the plurality of recipients is associated with a message of a different type; and
  send the formatted message to each of the plurality of recipients according to the selected transfer medium;
  wherein the one or more criteria include at least one of transfer medium cost, transfer medium reliability and message priority.

15. The non-transitory machine-readable storage medium of claim 14, further comprising instructions that when executed enable a mobile computing device to receive a component including at least one of: text, hypertext markup language (HTML), extensible markup language (XML), an audio file, an image, or a video file.

16. The non-transitory machine-readable storage medium of claim 14, further comprising instructions that when executed enable a mobile computing device to determine a message type according to the at least one received component.

17. The non-transitory machine-readable storage medium of claim 14, the message types comprising one or more of voice or data messages, voicemail messages, fax messages, video conferencing messages, instant messaging (IM) messages, e-mail messages, short message service or enhanced message service (SMS/EMS) messages, and multimedia message service (MMS) messages.

18. The non-transitory machine-readable storage medium of claim 14, further comprising instructions that when executed enable a mobile computing device to:
   receive an alert that the sent message is not read/received within a time period;
   select at least one of an alternate message type or an alternate transfer medium; and
   resend the message according to the alternate message type and/or transfer medium.

19. The non-transitory machine-readable storage medium of claim 14, further comprising instructions that when executed enable a mobile computing device to:
   receive confirmation that the message was received successfully; and
   store the selected transfer medium and message type.

20. The non-transitory machine-readable storage medium of claim 14, further comprising instructions that when executed enable a mobile computing device to:
   prompt for approval from the sender of the selected message type and transfer medium;
   send the formatted message according to the selected transfer medium when the sender approves; or
   receive an override comprising at least one of an alternate transfer medium or an alternate message type from the sender when the sender does not approve; and
   send the message according to the override.

* * * * *